United States Patent
Borg et al.

(10) Patent No.: US 7,073,846 B2
(45) Date of Patent: Jul. 11, 2006

(54) BONNET LIFT WITH ACTUATOR FITTED WITH A HOOK LATCHING SYSTEM

(75) Inventors: Evrard Borg, Sanary (FR); Eric Laspesa, Six Fours les Plages (FR); Jean-Paul Nadeau, Ollioules (FR)

(73) Assignee: Pyroalliance, Les Mureaux (FR)

( * ) Notice: Subject to any disclaimer, the term of this patent is extended or adjusted under 35 U.S.C. 154(b) by 42 days.

(21) Appl. No.: 11/018,522

(22) Filed: Dec. 22, 2004

(65) Prior Publication Data
US 2005/0151393 A1 Jul. 14, 2005

(30) Foreign Application Priority Data
Jan. 14, 2004 (FR) .................................. 04 00310

(51) Int. Cl.
*B60J 7/00* (2006.01)

(52) U.S. Cl. .................................. 296/187.13; 180/274

(58) Field of Classification Search ........... 296/187.13; 180/274, 282, 271
See application file for complete search history.

(56) References Cited

U.S. PATENT DOCUMENTS

| | | | | |
|---|---|---|---|---|
| 4,012,807 A * | 3/1977 | Kern | ........................... | 180/69.2 |
| 5,339,494 A * | 8/1994 | Esau et al. | ..................... | 16/294 |
| 5,435,406 A * | 7/1995 | Gaffoglio et al. | ...... | 296/146.12 |
| 5,533,777 A * | 7/1996 | Kleemann et al. | ........... | 296/117 |
| 6,213,235 B1 * | 4/2001 | Elhardt et al. | ............. | 180/69.2 |
| 6,439,330 B1 * | 8/2002 | Paye | ..................... | 296/187.12 |
| 6,520,557 B1 * | 2/2003 | Benthaus et al. | .............. | 296/76 |
| 6,554,093 B1 * | 4/2003 | Sasaki et al. | ................ | 180/274 |
| 2005/0257980 A1 * | 11/2005 | Green et al. | ................. | 180/274 |

FOREIGN PATENT DOCUMENTS

| | | | |
|---|---|---|---|
| DE | 199 57 872 A | | 6/2001 |
| DE | 101 11 146 A | | 3/2002 |
| DE | 202 16 240 U | | 2/2003 |
| DE | 102 09 664 A | | 10/2003 |
| EP | 1293400 A2 | * | 3/2003 |
| FR | 2 848 947 A | | 6/2004 |
| GB | 2 373 218 A | | 9/2002 |
| JP | 2003089362 A | * | 3/2003 |

* cited by examiner

*Primary Examiner*—Kiran B. Patel
(74) *Attorney, Agent, or Firm*—Oliff & Berridge, PLC

(57) ABSTRACT

The technical field of the invention is that of devices used in the field of motor vehicle safety to protect a pedestrian in the event of a head-on impact between the said pedestrian and a motor vehicle.

More precisely, the invention relates to a safety device (1,100) for lifting the bonnet (29,129) of a motor vehicle in the event of a collision, comprising a mechanism (3,103) for lifting the said bonnet (29,129), an actuator (16,116) fitted with a pyrotechnic gas generator and a member for latching the said lift mechanism (3,103).

The main feature of this device is that the latching member consists of a hook (4,104) mounted pivotingly and fixedly attached to the said motor vehicle, the said actuator (16,116) inducing an action on the said hook (4,104) to unlatch the lift mechanism (3,103).

10 Claims, 7 Drawing Sheets

FIG.7 ent DE 199 57 872 also discloses a device for
BONNET LIFT WITH ACTUATOR FITTED WITH A HOOK LATCHING SYSTEM The technical field of the invention is that of devices used in the field of motor vehicle safety to protect a pedestrian in the event of head-on impact between the said pedestrian and a motor vehicle.

When a pedestrian is hit by the front of a motor vehicle, the pedestrian's head usually comes into direct contact with the bonnet of the vehicle. The impact of the head on the bonnet causes deformations of the bonnet. These deformations often occur until the bonnet makes contact with the engine block and any rigid pieces such as the shock absorber shaft, windscreen wiper mechanism, etc. The movement of the pedestrian's head is then suddenly stopped by the bonnet in contact with the engine block and therefore sustains a violent deceleration that can cause serious injury to the pedestrian.

In the prior art, there are known devices that can be used, when there is an impact between a pedestrian and a motor vehicle, to raise the vehicle bonnet by a certain height in order to prevent the pedestrian's limbs and particularly his head from being stopped, at the time of impact against the bonnet, by the engine block situated just below the bonnet. In the devices of the prior art, the bonnet is lifted at the rear end of the bonnet, that is to say closest to the windscreen, which is opposite the end used to open or close the bonnet during its normal operation, the bonnet remaining attached at the front of the motor vehicle.

Patent application GB 2 373 218 describes a device used to lift the bonnet of a motor vehicle during a collision. This device comprises a structure that can be inflated with the aid of a gas generator. This structure consists of a plastically deformable material. In this device, the gas generator is coupled to a collision detector which is used, as in preceding applications, to raise the bonnet at an extremely early moment, that is to say when the vehicle strikes the pedestrian. In this case, the bonnet is already raised when for example the head of the pedestrian strikes the bonnet. In such a device, the gas generator has to be placed directly beneath the inflatable structure in order to be able to obtain a rapid and immediate inflation of the structure. The installation of such a device will therefore require having a considerable space beneath the motor vehicle bonnet. Free space in a vehicle is an increasingly rare thing in particular to the profusion of mainly electronic devices. Furthermore this device, once used, must be replaced in its entirety.

Document U.S. Pat. No. 6,439,330 describes a device for lifting the bonnet of a motor vehicle. This device comprises an assembly for the lifting action, fitted with an arm mounted rotatably at one of its ends with a bracket fixedly attached to the bonnet. The second end of the arm is fixedly attached to a rotation shaft mounted on a rail and capable of sliding along the said rail. A pyrotechnic actuator comprises a rod whose end is mounted rotatably on the said rotation shaft. The extraction of the rod due to the action of the gases generated in the actuator therefore causes the translation of the shaft along the rail, which causes the bonnet to lift. The device described also has a latching device responsible for locking the lift assembly when the latter is at rest and therefore for preventing the bonnet from lifting.

A device as described in the latter American patent combines a translation and a rotation of its lift assembly to obtain the lifting of the bonnet. Such kinematics therefore require the use of a specific piece, in this instance that of a rail, to achieve the translation of the end of the arm.

Document DE 199 57 872 also discloses a device for lifting a bonnet of a motor vehicle. According to a first configuration, this device comprises a push-rod mounted rotatably at its two ends with, on the one hand, at its first end, the vehicle bonnet and on the other hand, at its second end, a deformable element fixedly attached to the vehicle. A pyrotechnic actuator comprises a rod whose end is mounted pivotingly at a point situated substantially in the middle of the push-rod. This pyrotechnic actuator is placed beneath the push-rod so that, when it is actuated, its rod is extracted vertically to cause the push-rod to pivot. During an impact with a pedestrian, the extraction of the rod therefore causes the push-rod to pivot about the shaft situated at its second end. When the push-rod has pivoted, the impact produced by the pedestrian against the bonnet causes the push-rod to seesaw about its central point, this seesaw action of the push-rod being made possible by the deformation of the deformable element.

According to a second configuration of this device, the push-rod, at its second end, is directly attached to the vehicle. During the impact of the pedestrian against the bonnet, the push-rod does not seesaw while pivoting about its central point where it is fixed to the rod, but twists on its portion situated between its central point and its first end.

Such a device, the inverse of that described in American document U.S. Pat. No. 6,439,330, makes it possible to dispense with the use of a rail to achieve the lifting of the bonnet. In addition, such a device uses simple operating kinematics since the lifting is achieved only by rotation of the push-rod. However, it does not use any latching device making it possible to prevent the bonnet opening. In addition, in such a device, the bonnet is lifted entirely and directly by the actuator rod. The force needed to be generated to lift the bonnet must consequently be very great and therefore requires the use of a considerable quantity of pyrotechnic material. Using such a device may therefore be bulky and voluminous.

The aim of the invention is therefore to obtain a safety device that can be actuated in the event of a motor vehicle impact against a pedestrian, that can be reversed by a simple manual pressure exerted downwards on the bonnet. This reversibility function is provided by a pivoting latch hook whose geometry and positioning make it possible for the said device to be "re-latched". Thus, once the device has been triggered, it is possible to return the bonnet to its usual position on the vehicle so that it is possible to drive the said vehicle and have it repaired. It should be specified that, when the device has operated, the hot gases of the cylinder prevent the bonnet from lowering again. Closing the bonnet by simple "manual pressure" is possible only when the gases have cooled, that is to say after several minutes.

In the following description, the expression "rotation shaft" must be understood as representing either the fictional line about which rotation takes place or the mechanical piece allowing this rotation to take place.

The object of the invention concerns a safety device for lifting the bonnet of a motor vehicle in the event of a collision, comprising a mechanism for lifting the said bonnet, an actuator fitted with a pyrotechnic gas generator and a member for latching the said lift mechanism, characterized in that the latching member consists of a hook mounted pivotingly and fixedly attached to the said motor vehicle, the said actuator inducing an action on the said hook to unlatch the lift mechanism.

Thus, the actuator causes, either directly or via a mechanical piece, the pivoting of the hook to unlatch the safety device.

Advantageously, the hook has a return system allowing it to position itself once the device has operated.

Preferably, the return system consists of a coil spring. In this manner, the return system makes it possible, on the one hand, for the hook to remain in contact with the lift mechanism to prevent it from deploying when the safety device has not functioned and, on the other hand, after the said device has been triggered, to return the said hook to a position such that it allows the "re-latching" of the said lift mechanism.

Preferably, the actuator comprises a piston capable of moving under the effect of the gases produced by the generator to move the hook and unlatch the lift mechanism.

Advantageously, the lift mechanism comprises a rotating arm having at one end a rotation shaft retained by the hook, the said shaft corresponding to the rotation shaft for the normal opening of the bonnet, and having at its other end two rotation shafts for the rotation of the said arm during the operation of the said device.

Preferably, the three shafts are parallel with one another.

Advantageously, the arm consists of an elongate main piece having a U-shaped section within which is housed the pyrotechnic actuator, these two elements each having a rotation shaft corresponding to the two rotation shafts situated at the same end of the said arm.

Preferably, the main piece supports a sliding piece about which a lift bracket integral with the bonnet is articulated, the said articulation taking place about the rotation shaft used for the normal opening of the said bonnet, the said shaft being initially retained by the hook.

Advantageously, the piston has a rod having a shoulder and the main piece of the rotating arm comprises a protuberance with a flat, such that the motion of the piston is stopped when the shoulder butts up against the flat of the said protuberance.

Preferably, the rotation shaft of the main piece is situated above the rotation shaft of the actuator relative to the surface on which the arm is installed on the vehicle.

Ignition of the actuator causes the movement of the cylinder which, initially, pushes the hook to unlatch the lift mechanism and, secondly, presses by means of the shoulder situated on its rod against the flat of a protuberance of the main piece of the rotating arm. Because the rotation shaft of the said piece is situated above that of the pyrotechnic actuator, the arm pivots as it lifts, causing the bonnet to be lifted by means of the bracket mounted pivotingly about the sliding piece situated in the main piece of the arm. When the arm lifts, the said sliding piece moves allowing the said main piece to lengthen. The motion thus imparted to the bonnet is a purely rotary motion, making it possible to cancel out the induced forces on the front rotation points of the bonnet.

According to a second preferred embodiment of the invention, the lift mechanism is situated between the pyrotechnic actuator comprising a push cylinder, and the latching hook, the said mechanism, when the device is triggered, sustaining a translarional motion followed by a rotary motion.

Advantageously, the pyrotechnic actuator and the hook are fixedly attached to the vehicle and the lift mechanism comprises an elongate push-rod having a U-shaped section.

Advantageously, the push-rod comprises along its length two lateral edges parallel with one another, each of the said edges having two slots and a protuberance.

Preferably, the push-rod comprises a front portion situated close to the hook and a rear portion situated close to the actuator, each lateral edge having one slot and the protuberance on its rear portion and having the other slot on its front portion.

Preferably, the push-rod has an interruption on its front portion and the hook has a notch such that when the device is triggered, the said interruption butts up against the said notch to cause the said hook to pivot.

Advantageously, the slot of the rear portion of the push-rod is situated above the protuberance relative to the surface on which the actuator is installed on the vehicle.

Advantageously, the slot of the rear portion of each lateral edge of the push-rod is traversed by a rotation shaft fixedly attached to the vehicle and the actuator is positioned such that, when the device is triggered, the said actuator exerts pressure on the push-rod at the protuberance.

Preferably, the slot of the front portion of each lateral edge of the push-rod is traversed by a rotation shaft retained by the hook, the said shaft corresponding to the rotation shaft for the normal opening of the bonnet.

Preferably, the rotation shaft passing through the slot in the front portion of each lateral edge of the push-rod also passes through a lift bracket fixedly attached to the bonnet, such that the said bracket is articulated about the front portion of the said push-rod by means of the said shaft.

Advantageously, the two slots of each lateral edge of the push-rod have their large section shafts parallel with one another helping to make possible a translational motion of the said push-rod in a direction parallel with the said shafts.

Advantageously, the hook is locked in its return travel by a stop fixedly attached to the vehicle.

Preferably, the hook comprises a rounded outer surface which, when the said hook is locked against the stop, promotes the re-latching of the safety device, the re-latching operation consisting in re-engaging the rotation shaft in the hook by simply pushing manually on the bonnet. This closure of the bonnet is possible only a few minutes afterwards, during which time the gases emitted by the pyrotechnic charge cool down sufficiently.

The ignition of the actuator causes the movement of the cylinder which pushes in a translarional motion the push-rod whose interruption in the front portion butts up against the notch of the hook. The stroke of the push-rod corresponds to the movement of the rotation shaft from one end of the slot of the rear portion of the push-rod to its other end then serving as a stop. The pivoting of the hook releases the lift mechanism which then rotates about the rotation shaft situated in the slot of the rear portion of the push-rod, the said shaft having butted up against one of the two ends of the said slot. The push-rod lifts at its front portion causing the lift bracket to rise and hence the bonnet to rise.

The safety devices according to the invention have the advantage of imparting to the bonnet a pure rotary motion and therefore of preventing any pressure on the front rotation points of the bonnet. This way, the normal closure system of the bonnet is not damaged by the triggering of the safety devices according to the invention.

They also have the advantage of being articulated about a rotation shaft that already exists which is the one about which the bonnet is normally closed, thus making it possible to simplify the operating mechanism of the said devices by reducing the number of pieces involved. Finally, the safety devices according to the invention have the advantage of having a reduced bulk thanks to a compact layout of the said pieces.

There follows the detailed description of two preferred embodiments of the invention with references to FIGS. 1 to 7.

Figure 1:
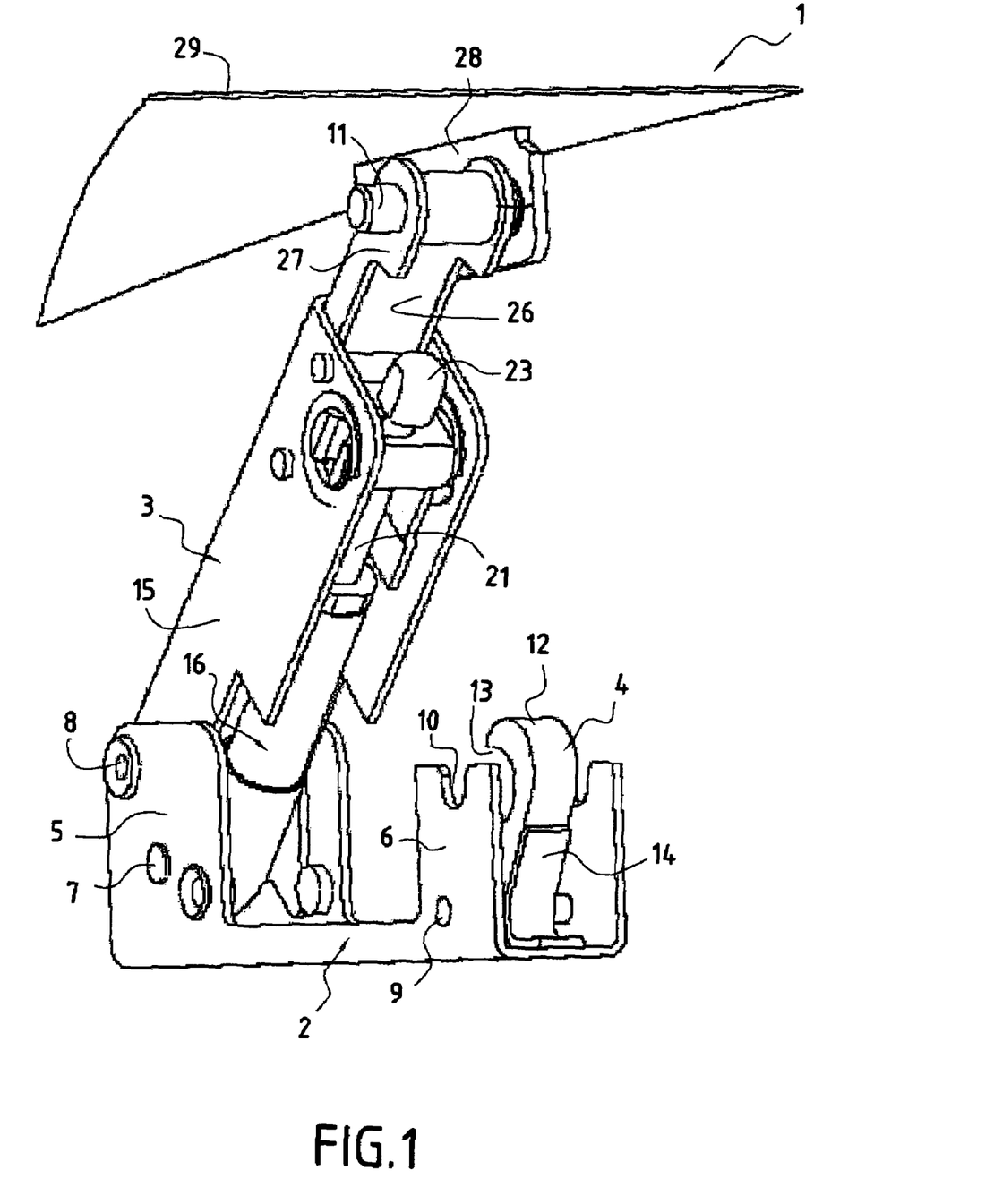
FIG. 1 is a view in perspective of a first embodiment of a safety device according to the invention, at the end of operation.
Figure 2:
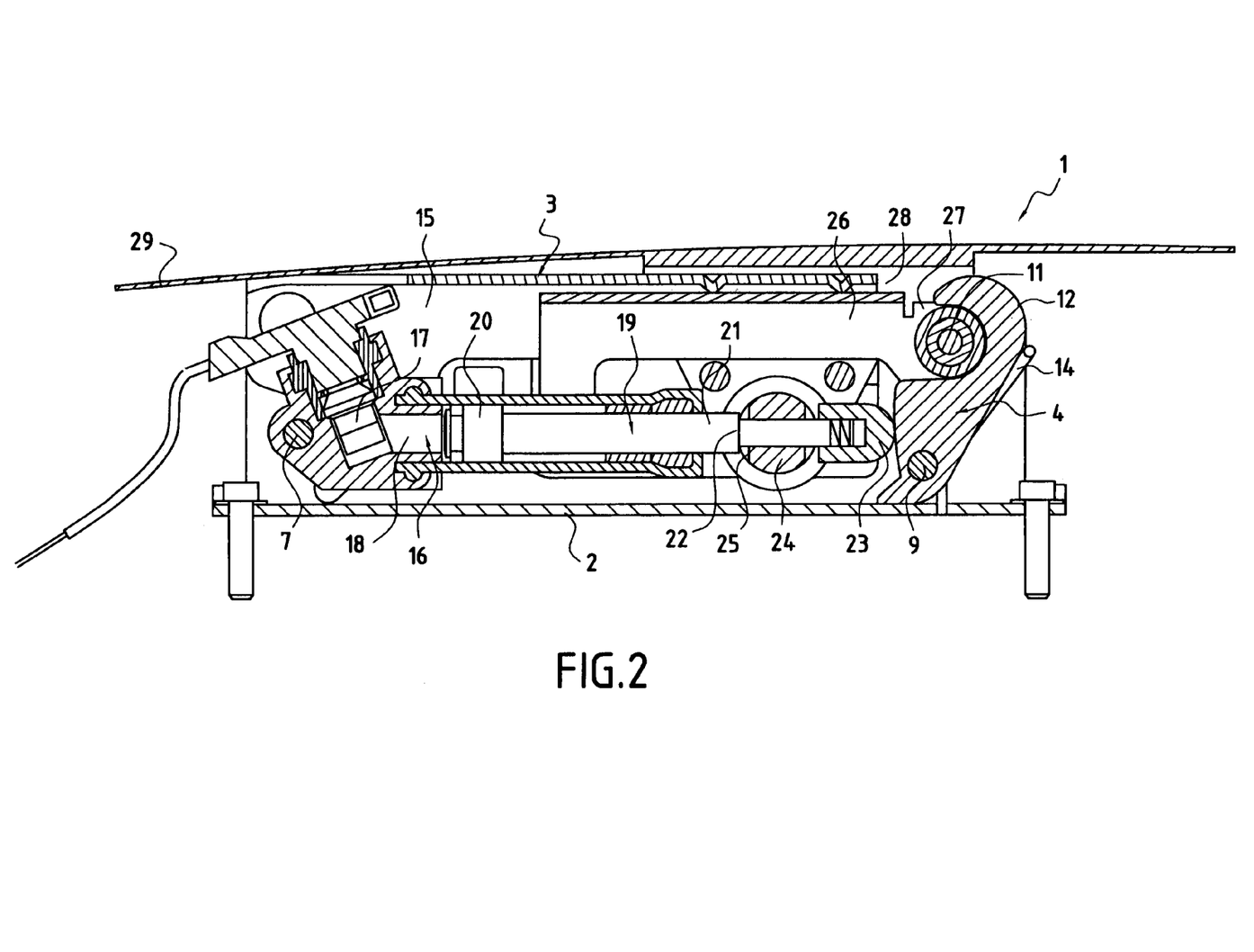
FIG. 2 is a view in axial longitudinal section of the safety device of FIG. 1, before operation.
Figure 3:
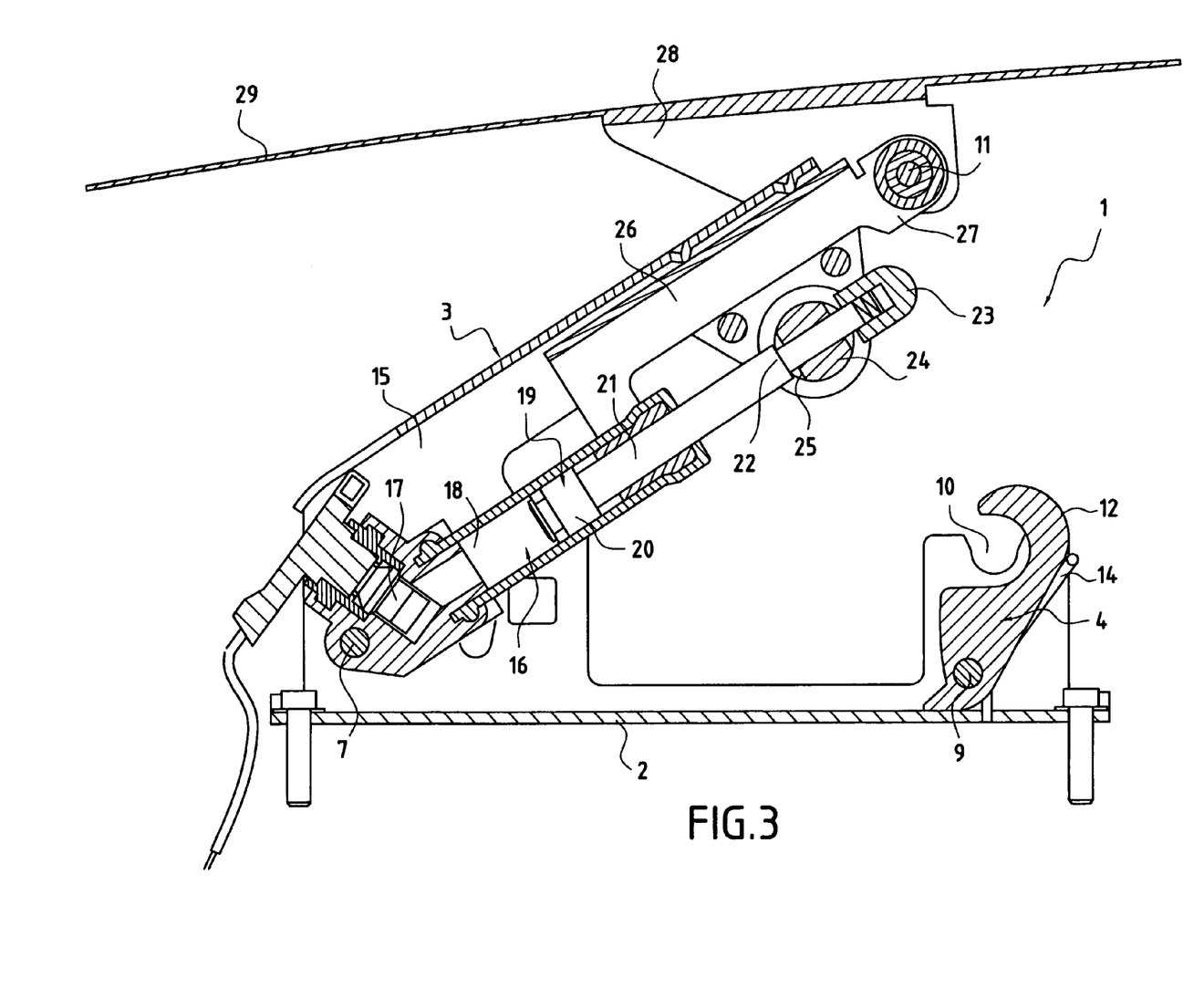
FIG. 3 is a view in axial longitudinal section of the safety device of FIG. 1, during operation.

With reference to FIGS. 1, 2 and 3, a first preferred embodiment of a safety device 1 according to the invention comprises a support piece 2 attached to the vehicle, a lift mechanism 3 articulated about the support piece 2 and a latching hook 4 fixedly attached to the said support piece 2.

The support piece 2 is elongate and comprises a rear portion 5 with two raised edges whose surface planes are parallel with one another, such that the said rear portion 5 has a U-shaped section, and a front portion 6 also with two raised edges whose surface planes are parallel with one another such that the said front portion 6 also has a U-shaped section. Each of the two raised edges of the rear portion 5 has two openings which correspond from one edge to the other, each of the two openings of one and the same edge being intended to receive a rotation shaft 7, 8 in the form of a small cylindrical piece, each of the two shafts 7, 8 joining the two edges and being parallel with one another. For a given edge, one of the two openings, called the top opening, is situated above the other opening, called the bottom opening, relative to the surface on which the support piece 2 is installed on the vehicle, the said top opening being placed closer to the end of the support piece 2 than is the bottom opening. Each of the two raised edges of the front portion 6 of the support piece 2 has an opening placed one opposite the other, the said openings being intended to receive a rotation shaft 9 in the form of a small cylindrical piece. The three rotation shafts 7, 8, 9 passing through the support piece 2 are parallel with one another. The two raised edges of the front portion 6 of the support piece 2 have a notch 10 on their top edge, each of the said notches 10 being placed one opposite the other and being intended to receive a rotation shaft 11 in the form of a cylindrical piece, the said shaft 11 being parallel with the three other rotation shafts 7, 8, 9 passing through the support piece 2.

With reference to FIGS. 2 and 3, the hook 4 has a bottom portion and a top portion relative to the surface on which the support piece 2 is installed on the vehicle, the bottom portion being the closest to the said surface, and two lateral faces relative to a fictional line passing through the bottom and top portions along their greatest length, one of the two lateral faces, called the front face, facing the rear portion 5 of the support piece 2, and the other, called the rear face, being situated behind the hook 4. The bottom portion comprises an opening intended to receive the rotation shaft 9 passing through the front portion 6 of the support piece 2 and the top portion, which has a rounded contour 12, has a rounded lateral notch 13 cut out on the front lateral face of the hook 4 and designed to receive the rotation shaft 11 supported by the notches 10 of the front portion 6 of the support piece 2. The hook 4 which is capable of making a rotary motion about the rotation shaft 9 passing through its bottom portion, is pushed back, in a given direction, by means of a return system 14 in the form of a leaf spring, attached to the support piece 2 and pressing against the rear lateral face of the spring 14. A stop not visible in the figures and placed inside the support piece 2 limits the return travel of the said hook 4. The lift mechanism 3 comprises a rotating arm consisting of an elongate main piece 15 having a U-shaped section in which is housed a pyrotechnic actuator 16 having a V-shaped cylindrical body in which are situated successively a pyrotechnic charge 17, a combustion chamber 18 and a push cylinder 19. With reference to FIGS. 2 and 3 from which the raised edge of the main piece 15 of the rotating arm has been removed to make it possible to see the inside of the said piece 15, one segment of the said body comprises the said pyrotechnic charge 17, and the other segment encloses the said combustion chamber 18 and the said cylinder 19. The cylinder 19 has an enlarged portion 20 whose external diameter is less than the internal diameter of the body of the actuator 16, such that the said enlarged portion 20 can slide hermetically in the said body, and a rod 21 having a shoulder 22 making it possible to distinguish a first portion extending the enlarged portion 20 of the cylinder 19, and a second portion of lesser diameter whose end terminates with a head 23 also of enlarged diameter. The main piece 15 of the rotating arm comprises a rear portion whose two raised edges are pierced with a hole facing each other and intended to receive the rotation shaft 8 passing through the top openings of the rear portion of the support piece 2. The pyrotechnic actuator 16 also has a rear portion corresponding to the position of the pyrotechnic charge 17, the said portion being pierced with a hole intended to receive the rotation shaft passing through the bottom openings of the rear portion of the support piece 2. The main piece 15 of the rotating arm comprises a front portion having a lateral protuberance 24 furnished with a flat 25 whose plane is parallel to the plane defined by the shoulder 22 of the rod 21 of the cylinder 19. The front portion of the main piece 15 of the rotating arm comprises an elongate sliding piece 26, having two raised edges having surface planes parallel with one another, such that the said sliding piece 26 has a U-shaped section. Each of the raised edges of the sliding portion 26 terminates with an enlarged rounded end 27, with a hole in it, each of the holes facing one another and forming a passage to receive the rotation shaft 11 supported by the two notches 10 of the front portion 6 of the support piece 2. The enlarged end 27 of each of the raised edges of the sliding piece 26 forms a stop to prevent the said sliding piece 26 from reentering completely into the main piece 15 of the rotating arm. A lift bracket 28 consisting of a piece having two surface planes perpendicular to one another provides the link between the sliding piece 26 and the bonnet 29 of the vehicle to which it is fixedly attached. One plane of the lift bracket 28 is perforated so that it can be traversed by the rotation shaft 11 passing through the enlarged rounded end 27 of the sliding piece 26, and the other plane of the said bracket 28 is attached to the bonnet 29 of the vehicle by means of a plurality of bolts not shown in the figures.

The mode of operation of the first preferred embodiment of the invention is as follows.

With reference to FIG. 2, the ignition of the pyrotechnic charge 17 causes, initially, the production of gas in the combustion chamber 18 and, secondly, the movement of the cylinder 19. Chronologically, the head 23 of the said cylinder 19 pushes the hook 4 at its bottom portion to cause it to pivot and release the rotation shaft 11 initially retained by the top portion of the said hook 4, then, the shoulder 22 of the rod 21 of the cylinder 19 comes into contact with the flat 25 of the protuberance 24 to exert pressure on the main piece 15 of the mobile arm. With reference to FIGS. 1 and 3, the said main piece 15 and the actuator 16, which is fixedly attached to it, rotate in the anticlockwise direction about their rotation shafts 7, 8 passing through the rear portion 5 of the support piece 2. The mobile arm then lifts at its front portion. As the arm lifts, the sliding piece 26 emerges gradually from the main piece 15 conferring on the latter a telescopic character. The bonnet 29 is then lifted by means of the lift bracket 28 which is articulated about the sliding piece 26 and whose positioning is adjusted by increasing the apparent length of the main piece 15 during the lifting phase. The various articulations involved in this device 1 impart upon the bonnet 29 a pure rotary motion about the fictional rotation axis consisting of the normal closure system of the said bonnet 29 on the vehicle, the said system being situated at the front of the said vehicle. The specific geometry of the hook 4 and its positioning occasioned by the return system 14 and the stop make it possible by simply pressing on the bonnet 29 to lower the said bonnet 29 again in order to re-engage the rotation shaft 11 of the sliding portion 26 in the said hook 4. The device 1 may thus easily be re-latched. It should be noted that this manual closure is possible only when the gases have cooled, that is to say several minutes after the device has operated.

Figure 4:
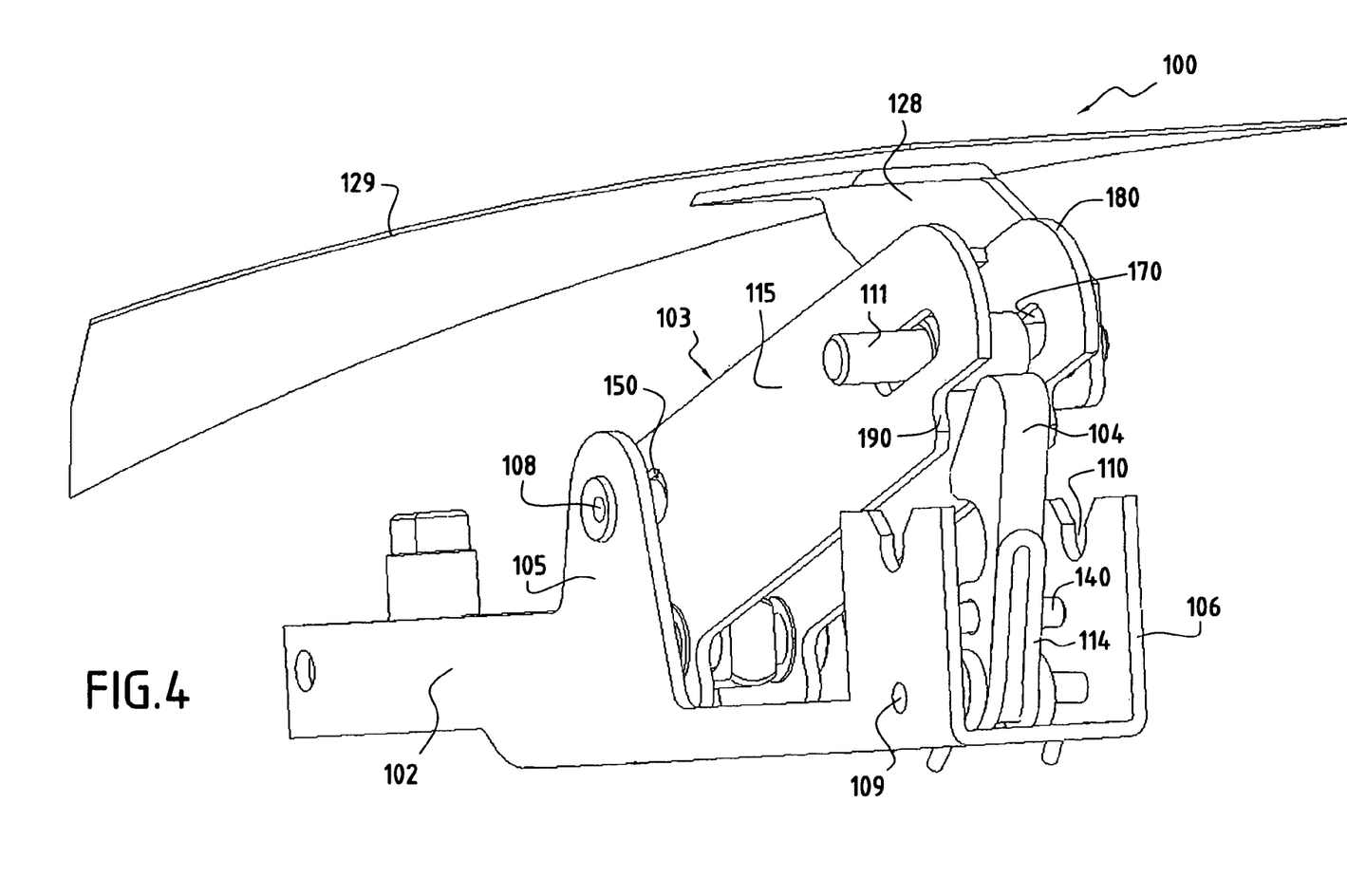
FIG. 4 is a view in perspective of a second embodiment of a safety device according to the invention, during operation.
Figure 5:
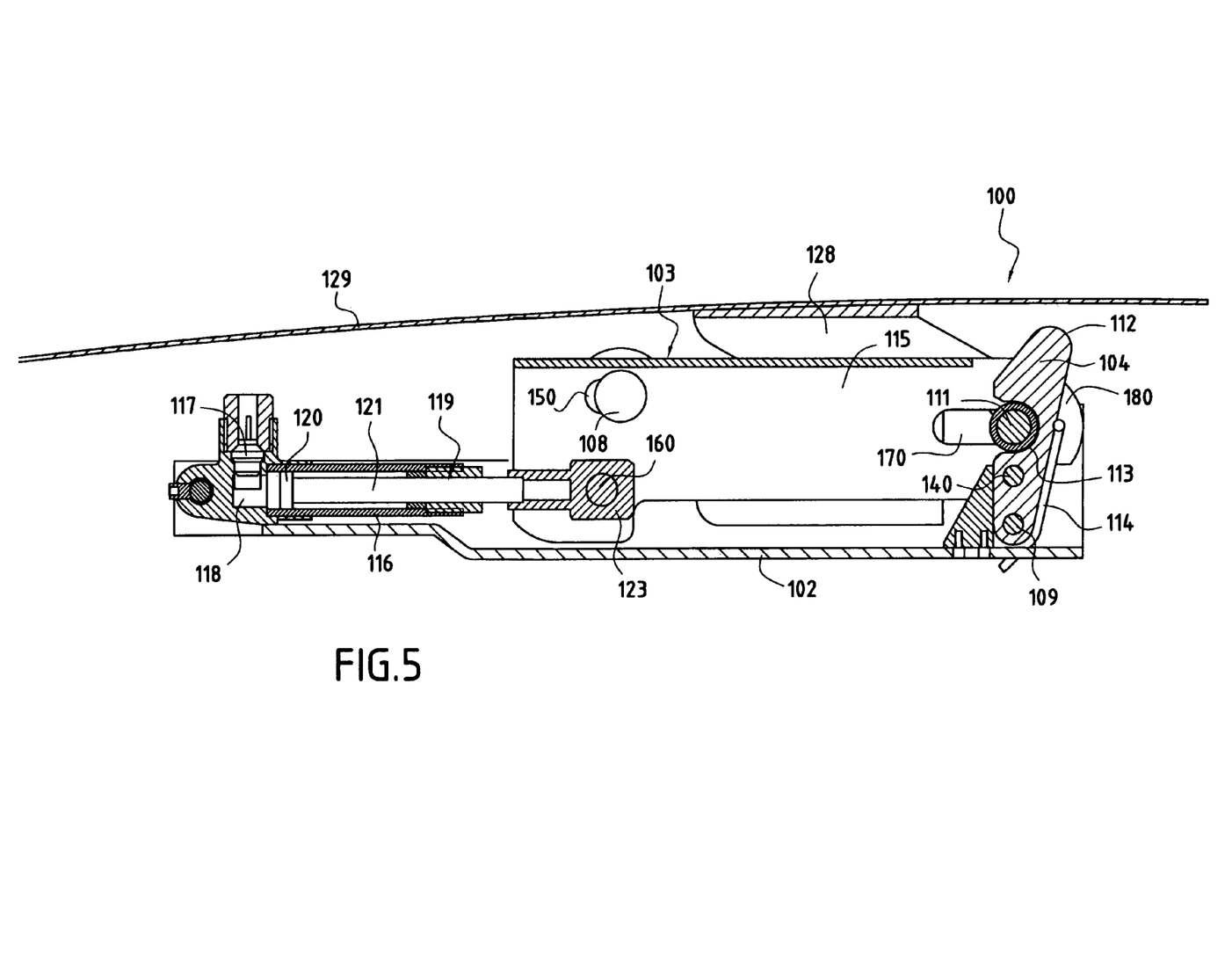
FIG. 5 is a view in axial longitudinal section of the safety device of FIG. 4, before operation.
Figure 6:
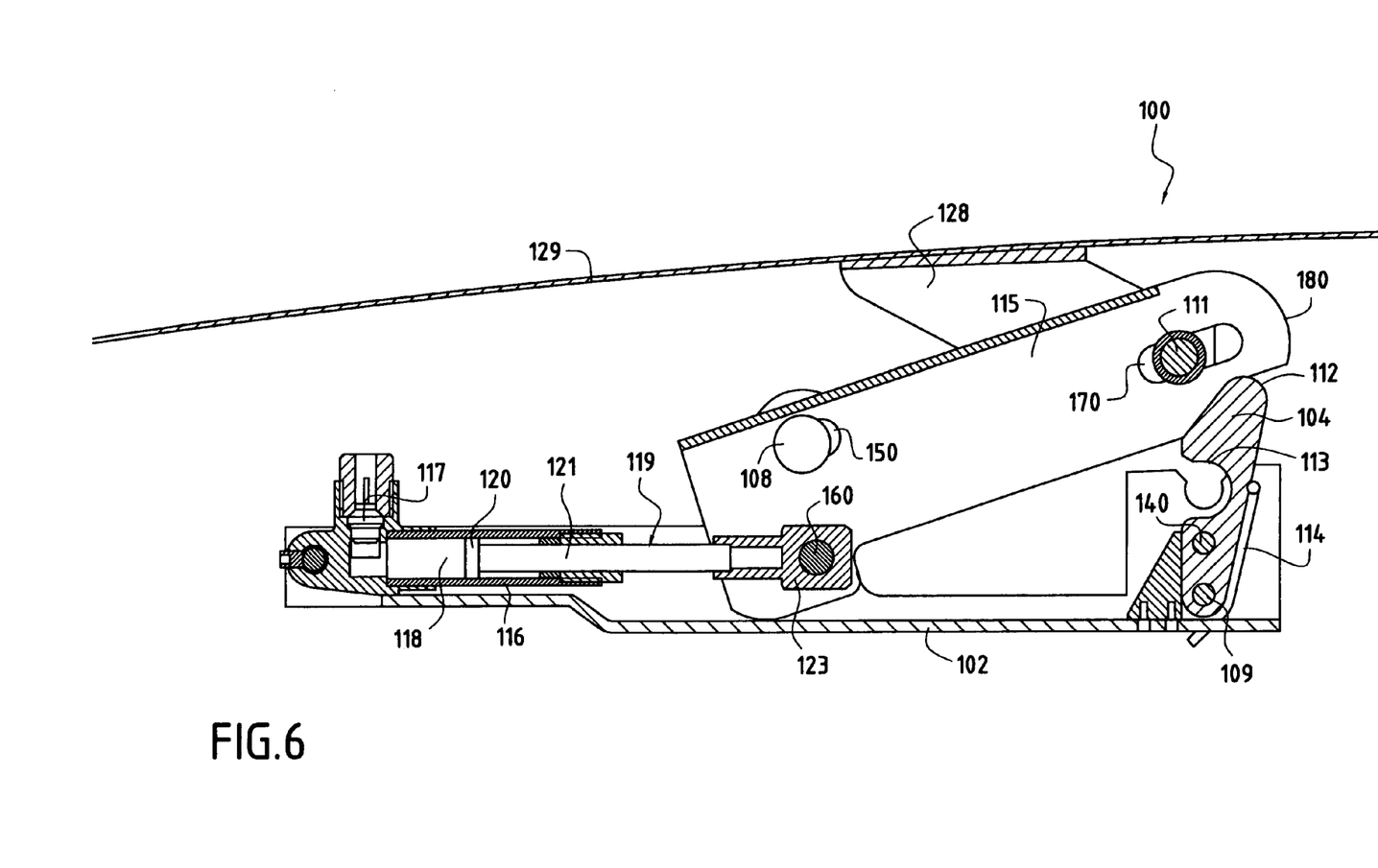
FIG. 6 is a view in axial longitudinal section of the safety device of FIG. 4, during operation.

With reference to FIGS. 4 to 6, a second preferred embodiment of a safety device 100 according to the invention comprises a lift mechanism 103 situated between a pyrotechnic actuator 116 and a latching hook 104, the said actuator 116 and the said hook 104 being fixedly attached to a support piece 102 attached to the vehicle. The support piece 102 which is elongate, comprises a rear portion 105 with two raised edges whose surface planes are parallel with one another such that the said rear portion 105 has a U-shaped section, and a front portion 106 also with two raised edges whose surface planes are parallel with one another such that the said front portion 106 has a U-shaped section. Each of the two raised edges of the rear portion 105 has a hole, the said holes corresponding from one edge to the other in order to define a passage intended to receive a rotation shaft 108 in the form of a small cylindrical piece. The said holes are situated at the top portion of the rear portion 105 of the support piece 102, relative to the surface on which the support piece 102 is installed on the vehicle.

The pyrotechnic actuator 116 has an L-shaped cylindrical body in which are situated successively a pyrotechnic charge 117, a combustion chamber 118 and a push cylinder 119. With reference to FIGS. 5 and 6, one segment of the said body comprises the pyrotechnic charge 117 and the other segment encloses the said combustion chamber 118 and the said cylinder 119. The cylinder 119 has an enlarged portion 120 whose external diameter is less than the internal diameter of the body of the actuator 116, such that the said enlarged portion 120 can slide in a sealed manner in the said body, and a rod 121 terminating with an enlarged head 123 with a hole in it. Each of the two raised edges of the front portion 106 of the support piece 102 has an opening placed one opposite the other, the said openings being intended to receive a rotation shaft 109 in the form of a small cylindrical piece. The two raised edges of the front portion 106 of the support piece 102 also have a notch 110 on their top edge, each of the said notches 110 being placed facing one another and being intended to receive a rotation shaft 111 in the form of a cylindrical piece. With reference to FIGS. 5 and 6, the hook 104 has a bottom portion and a top portion relative to the surface on which the support piece 102 is installed on the vehicle, the bottom portion being the closest to the said surface, and two lateral faces relative to a fictional line passing through the bottom and top portions along their greatest length, one of the two lateral faces, called the front face, facing the rear portion 105 of the support piece 102, and the other, called the rear face, being situated behind the hook 104. The bottom portion comprises an opening intended to receive the rotation shaft 109 passing through the front portion 106 of the support piece 102 and the top portion, which has a rounded contour 112, has a rounded lateral notch 113 cut out of the lateral front face of the hook 104 and designed to receive the rotation shaft 111 supported by the notches 110 of the front portion 106 of the support piece 102. The hook 104 that is capable of making a rotary motion about the rotation shaft 109 passing through its bottom portion is pushed back in a given direction by means of a return system 114 in the form of a coil spring, fixed to the support piece 102 and whose bent segment presses against the rear lateral face of the said spring 114. The spring 114 is partially wound around the rotation shaft 109 passing through the bottom portion of the hook 104. The said bottom portion of the hook 104 comprises a stop pin 140 parallel with the rotation shaft 109 of the said hook 104 and situated between the top portion of the hook 104 and the said rotation shaft 109. A stop not visible in the figures and placed inside the support piece 102 limits the return travel of the said hook 104.

The lift mechanism 103 comprises an elongate push-rod 115 consisting of two elongate lateral edges, identical and parallel with one another and connected together by a linking edge whose surface plane is perpendicular to the surface planes of the said lateral edges. As shown in FIGS. 5 and 6, each of the two lateral edges of the push-rod 115 comprises a rear portion having a slot 150, each of the slots 150 facing one another to form a passage intended to receive the rotation shaft 108 passing through the holes in the rear portion 105 of the support piece 102, and a front portion. The slots 150 of the rear portion of the push-rod 115 and the holes of the rear portion of the support piece 102 correspond. The rear portion of the push-rod 115 is divided into a top zone and a bottom zone relative to the surface on which the support piece 102 is installed, the bottom zone being located between the top portion of the said push-rod 115 and the said installation surface. The slots 150 are situated in the said top zone of the rear portion of the push-rod 115.

Figure 7:
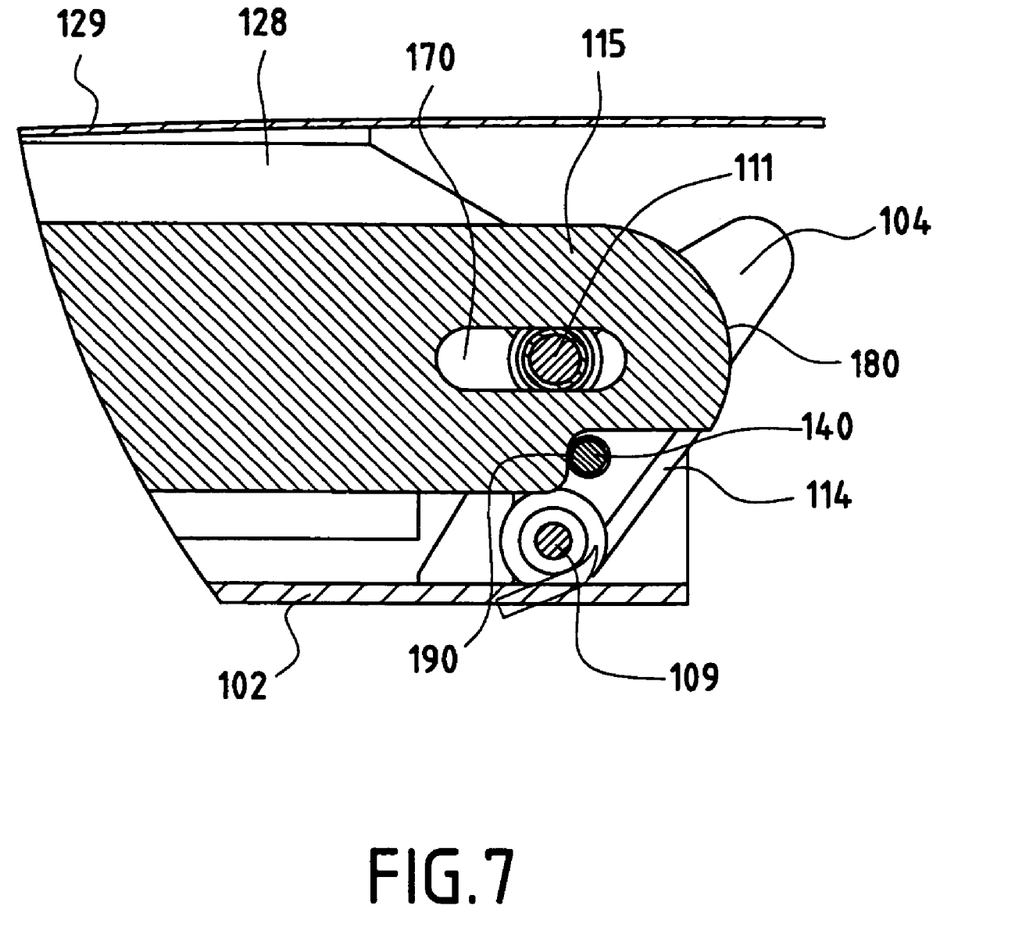
FIG. 7 is a view in axial longitudinal section of a portion of the safety device of FIG. 4.

The bottom zone has an attachment pin 160 whose axis is parallel to the rotation shaft 108 passing through the slot 150 of the rear portion of the push-rod 115. The actuator 116 is fixedly attached to the push-rod 115 by means of the said attachment pin 160 which passes through the enlarged head 123 of the rod 121 of the cylinder 119. With reference to FIG. 7, each lateral edge of the push-rod 115 has at its front portion a slot 170 whose large section shaft is parallel to the large section shaft of the slot 150 of the rear portion of the said push-rod 115, each of the said slots 170 of the front portion facing one another to form a passage intended to receive the rotation shaft 111 passing through the two notches 110 of the front portion 106 of the support piece 102, the said shaft 111 also passing through the rounded lateral notch 113 of the hook 104. The front portion of each of the two lateral edges of the push-rod 115 comprises a rounded end 180 and an interruption situated backward of the said end 180, the said interruption creating a bearing surface 190 intended to butt up against the stop pin 140 of the bottom portion of the hook 104.

A lift bracket 128 consisting of a piece having two surface planes perpendicular to one another provides the connection between the front portion of the push-rod 115 and the bonnet 129 of the vehicle to which it is fixedly attached. One plane of the lift bracket 128 is pierced in order to be traversed by the rotation shaft 111 passing through the slots 170 of the front portion of the push-rod 115 and the other plane of the said bracket 128 is attached to the bonnet 129 of the vehicle by means of a plurality of bolts not shown in the figures.

The mode of operation of the second preferred embodiment of the invention is as follows.

With reference to FIG. 5, the ignition of the pyrotechnic charge 117 causes, initially, the production of gas in the combustion chamber 118 and, secondly, the translational movement of the cylinder 119. Since the said cylinder 119 is fixedly attached to the push-rod 115, the said push-rod 115 also makes a translational motion thanks to the slots 150 and 170 that it comprises on its front and rear portions. With reference to FIG. 7, the front portion of the push-rod 115 comes into contact with the stop pin 140 of the hook 104 by means of the bearing surface 190 made by the interruption, and causes the hook 104 to pivot which then releases the rotation shaft 111 retained by the said hook 104. The translation of the push-rod 115 takes place until the slot 150 situated in the rear portion of the said push-rod 115 butts up against the rotation shaft 108 which passes through it and which is fixed to the rear portion 105 of the support piece 102. The push-rod 115 then pivots about the said rotation shaft 108 and lifts at its front portion which is now released. The bonnet 129 is then lifted by means of the lift bracket 128 which is articulated about the front portion of the push-rod 115. The said lifting is made possible by the slots 170 of the said front portion of the push-rod 115, allowing the rotation shaft 111 which passes through them to move in the said slots 170 to readjust the positioning of the said bracket 128 during the phase of lifting the bonnet 129.

The specific geometry of the hook 104 and its positioning, occasioned by the return system 114 and the stop, make it possible by simply pressing on the bonnet 129 to lower the said bonnet 129 again to re-engage the rotation shaft 111 of the front portion of the push-rod 115 in the said hook 104. The device 100 may thus easily be re-latched. The bonnet may not be closed until several minutes after the device has operated, allowing time for the gases produced by the generator to cool down.

The invention claimed is:

1. Safety device (1) for lifting the bonnet (29) of a motor vehicle in the event of a collision, comprising a mechanism (3) for lifting the said bonnet (29), an actuator (16) fitted with a pyrotechnic gas generator, the said actuator comprising a piston (19) capable of moving under the effect of the gases produced by the generator to move the hook (4) and release the lift mechanism (3) and a member for latching the said lift mechanism (3), the said member consisting of a hook (4) mounted pivotingly and fixedly attached to the said motor vehicle, the said actuator (16) interacting with the said hook (4) to unlatch the lift mechanism (3), characterized in that the lift mechanism (3) comprises a rotating arm having at one end a rotation shaft (11) retained by the hook (4), the said shaft (11) corresponding to the rotation shaft for the normal opening of the bonnet (29), and having at its other end two rotation shafts (7, 8) for the rotation of the said arm during the operation of the said device.

2. Safety device according to claim 1, characterized in that the hook (4) has a return system (14) allowing it to reposition itself once the device has operated.

3. Safety device according to claim 2, characterized in that the return system (14) consists of a coil spring.

4. Safety device according to claim 1, characterized in that the three shafts (7, 8, 11) are parallel with one another.

5. Safety device according to claim 1, characterized in that the arm consists of an elongate main piece (15) having a U-shaped section within which is housed the pyrotechnic actuator (16), these two elements each having a rotation shaft (7, 8) corresponding to the two rotation shafts situated at the same end of the said arm.

6. Safety device according to claim 5, characterized in that the main piece (15) supports a sliding piece (26) about which a lift bracket (28) integral with the bonnet (29) is articulated, the said articulation taking place about the rotation shaft (11) used for the normal opening of the said bonnet (29), the said shaft (11) being initially retained by the hook (4).

7. Safety device according to claim 6, characterized in that the piston (19) has a rod (21) having a shoulder (22) and the main piece (15) of the rotating arm comprises a protuberance (24) with a flat (25), such that the motion of the piston (19) is stopped when the shoulder (22) butts up against the flat (25) of the said protuberance (24).

8. Safety device according to claim 5, characterized in that the rotation shaft (8) of the main piece (15) is situated above the rotation shaft (7) of the actuator (16) relative to the surface on which the arm is installed on the vehicle.

9. Safety device according to claim 2, characterized in that the hook (4) is locked in its return travel by a stop fixedly attached to the vehicle.

10. Safety device according to claim 9, characterized in that the hook comprises a rounded outer surface (12) which, when the said hook (4) is locked against the stop, promotes the re-latching of the device, the re-latching operation consisting in re-engaging the rotation shaft (11) in the hook (4) by simply pushing on the bonnet (29).

* * * * *